Patented June 12, 1945

2,377,961

UNITED STATES PATENT OFFICE 2,377,961

MANUFACTURE OF WATER-SOLUBLE EGG ALBUMEN

Frederick F. Pollak, Yonkers, N. Y., assignor to Domestic Egg Products Inc., New York, N. Y., a corporation of New York No Drawing. Application April 22, 1942, Serial No. 440,111

2 Claims. (Cl. 260—122)

This invention relates to the manufacture of water soluble egg albumen and it also relates to the recovery of the soluble albumen from eggshells.

The soluble egg albumen is produced by separation of the same from the egg yolk as a gluey transparent mass and purification of the latter.

According to a known method this mass is acidified in cylinders and extracted with oil of turpentine whereby the egg yolk is supposed to accumulate on the surface of the liquid and the keratine is deposited on the bottom of the cylinder in the shape of flocks. The liquid is filtered through cotton cloth. Also tannic acid has been recommended as a purifying agent.

The method is unreliable. The resulting albumen solution is not clear and has a red tint which proves that the removal of the impurities is incomplete.

The frequent clogging of the filter causes grave inconveniences and renders a satisfactory performance of the method very difficult.

Therefore the commercial egg albumen has an orange or rose colored shade and is not wholly water soluble.

The inventor has found that the reason for the ineffectiveness of the known egg albumen recovery method is mainly based on the fact that a complete separation of the albumen from the yolk is extremely difficult and that the albumen solution remains contaminated with the egg yolk.

The latter is a watery suspension of the egg yolk oil and of lipoids such as lecithin which maintain the egg oil in the form of a very stable suspension in the albumen solution. The extraction with oil of turpentine does not result in a separation of the egg oil from the lipoids and therefore the albumen solution remains turbid. Also the dyestuff originated from the yolk is not removed in this manner. Furthermore, the application of bleaching and dissolving agents has proven to be ineffective.

The solution is rendered more difficult if egg shells are used as an initial material.

It has been proven that egg shells even upon thorough leaching still contain considerable quantities of albumen. The reason is of a twofold nature. The keratine of the shells has the property to swell in contact with water or aqueous solutions and the albumen solutions themselves are very highly viscous; both phenomena prevent the running off of the albumen solution. Egg shells even drained to dryness therefore still contain about 1.6% of their weight of dry albumen or about 2.5% of the total albumen present in the eggs. On the other hand egg shells being a waste product are a very welcome source for the recovery of the water soluble albumen.

For the production of the albumen from the egg shells the latter are leached with water and the same quantity of the solvent is repeatedly contacted with the shells to obtain a sufficiently concentrated albumen solution. In carrying out this leaching process it is very difficult to separate the egg yolk from the albumen solution, which also proves the importance of a method which permits a complete separation of the albumen solution from the egg yolk.

It is therefore the object of the invention to recover the soluble egg albumen in such a manner as to produce a clear solution which is free from contaminating substances and particularly free from egg yolk.

It is a further object of the invention to recover in a simple and expeditious manner the albumen which even after drainage to dryness still adheres to the egg shells.

It is also an object of the invention to effect with the recovery of the egg albumen a separation of the egg oil from the lipoids.

It is also an object of the invention to use extracting agents which disolve the yolk oil but do not influence the lipoids and which themselves are practically insoluble in water.

The invention is based on the recognition that a separation must be effected of the egg yolk from the lipoids by the action of the extracting or treating agent and that the latter may be soluble in water to a very limited degree only.

Solvents which dissolve the egg yolk oil but leave the lipoids unattacked such as acetone and the ethyl ether of the acetic acid are not usable for the purposes of this invention as they are water soluble to a considerable degree and therefore not apt to separate the egg yolk from the lipoids. This is obvious from the fact that an impetus for the decomposition of the suspension will not arise as long as the extracted substance due to the water solubility of the extracting agent is in the course of repeated leachings again and again dissolved in water.

Therefore the inventor was confronted with the problem to locate solvents or extracting agents which dissolve one of the components of the egg yolk, do not influence the other one and are practically water insoluble.

In accordance with the findings of the inventor substances of this type are the butyl, amyl, isobutyl and isoamyl esters of weak fatty acids such as butyl acetate and amyl acetate and the corresponding esters of formic acid, propionic acid and butyric acid.

These substances easily dissolve the egg yolk but do not act upon the lipoids. Furthermore they have the great advantage that they dissolve the dyestuff of the egg yolk.

According to the invention one or a plurality of the above referred-to extracting agents are added to the egg yolk and egg albumen containing solution or suspension and energetically mixed therewith. The mixture is then maintained at rest for a period of several minutes. By the dissolution of the egg yolk oil the suspension of the egg yolk in the albumen solution is destroyed and the egg yolk is accumulated in the shape of a pasty layer on the surface of the liquid and can be easily separated therefrom.

A more detailed mode of carrying out the invention is described in the following.

A given amount, for instance 100 parts by volume of a 6% egg albumen and egg yolk containing aqueous suspension are slightly acidified with acetic acid. 10 parts by volume of butyl acetate are added and intimately mixed therewith. The mixture is maintained at rest for approximately 30 minutes at an ordinary temperature. The total quantity of the egg yolk present is hereby accumulated together with the butyl acetate on the surface of the liquid as a pasty layer. The keratine remains suspended in the perfectly water-clear albumen solution in the form of flocks. These flocks may be easily removed by filtering. The surface layer consisting of the butyl acetate solution of the yolk oil and of the lipoids is separated from the albumen solution in any suitable manner. The thus obtained pure and clear albumen solution is evaporated to dryness at a temperature preferably not exceeding 50° C. A slightly yellowish transparent product results which is completely water soluble; the solution of the same is clear and has all the properties of fresh egg albumen.

The recovery of the extracting substance from the water insoluble surface layer may be easily effected by distillation of the latter with steam.

The invention is described in the specification by way of example only and various changes and modifications may be made to the details of the invention without departing from the broader spirit and scope thereof, as set forth in the following claims.

I claim:

1. Method for the manufacture of water soluble egg albumen from impure watery egg shell juice comprising treating the said juice with at least one water insoluble extracting agent selected from a group consisting of butyl, amyl, isobutyl and isoamyl esters of lower fatty acids, dissolving the egg yolk oil in the water insoluble extracting agent and separating the lipoids together with the egg oil solution from the albumen suspension.

2. Method for the manufacture of water soluble egg albumen from impure watery egg shell juice comprising treating the said juice with at least one water insoluble extracting agent selected from a group consisting of butyl, amyl, isobutyl and isoamyl esters of lower fatty acids, dissolving the egg yolk in the water insoluble extracting agent, forming an insoluble surface layer consisting of the suspension of the yolk oil in the extracting agent and of the lipoids, separating the said layer from the albumen solution and recovering the pure albumen from the said solution by evaporation at a temperature of about 50° C.

FREDERICK F. POLLAK.